E. Stuart,
Cotton Press.
Nº 67,147.   Patented July 23, 1867.
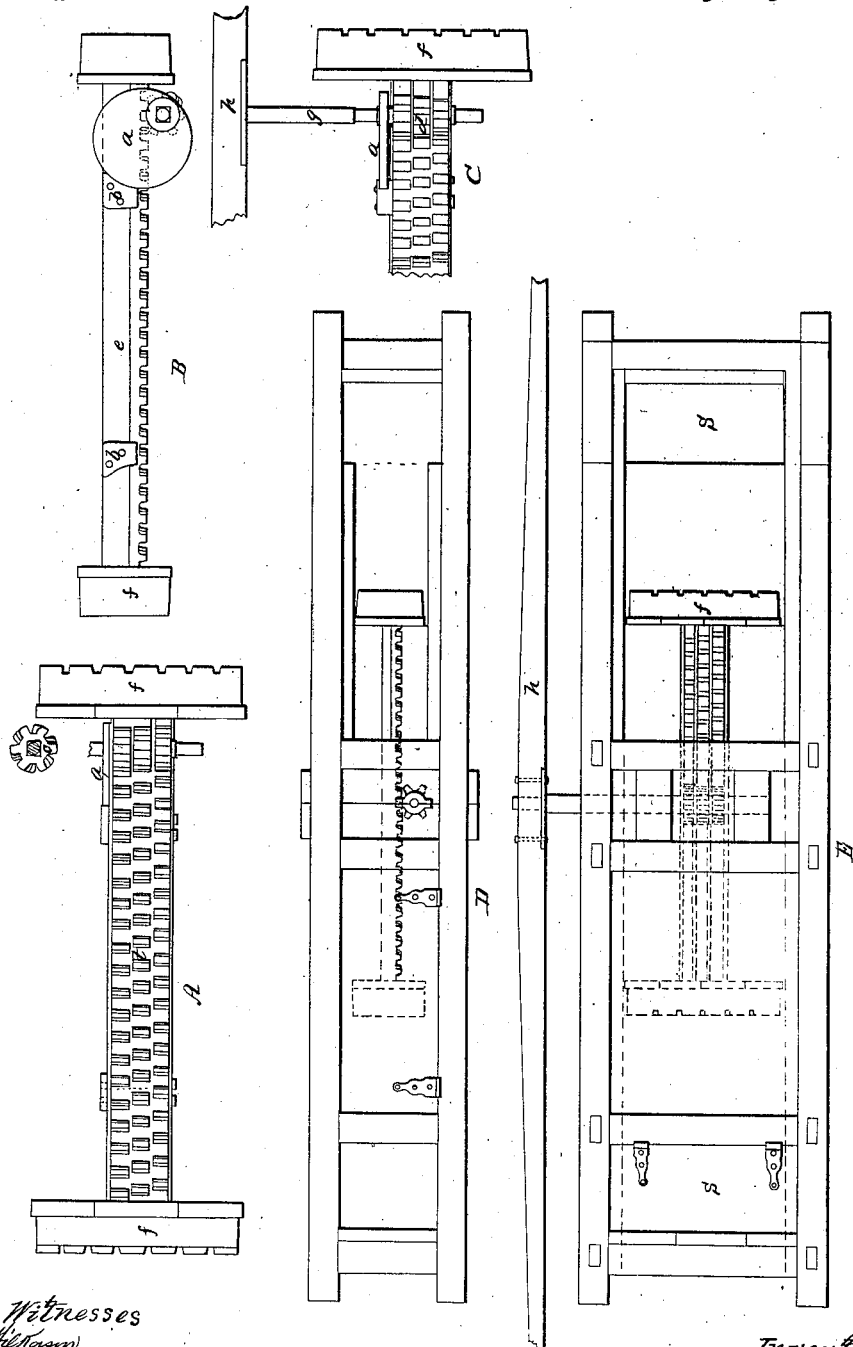
Witnesses
Inventor
Edward Stuart

United States Patent Office.

EDWARD STUART, OF SHUFORDSVILLE, MISSISSIPPI.

Letters Patent No. 67,147, dated July 23, 1867.

---

IMPROVEMENT IN COTTON-PRESS.

---

The Schedule referred to in these Letters Patent and making part of the same.

---

Be it known that I, EDWARD STUART, of Shufordsville, in the county of Coahoma, in the State of Mississippi, have invented a new and useful Improvement on a Cotton-Press; and I do hereby declare that the following is a full, clear, and exact description of the construction and operation of the same.

The section A is a side view of rack $t$, the plungers $ff$, the eccentric $a$, the pinion $d$, and the shoulders $bb$.

The section B is a top view of the rack $t$, the rack-bar $e$, the shoulders $bb$, the eccentric $a$, and the plungers $ff$.

The section C is a side view of shaft $g$, the pinion $d$, and lever $h$. The pinion $c$ is a top view.

The section D is a top view of cotton-press.

The section E is a side view of the same and lever.

The nature of my invention consists in the construction of cogs and eccentric-wheel working upon the principle of a wedge.

To enable others skilled in the art to make and use my invention, I will proceed to describe its construction and operation.

I construct three rows of cogs on the rack-bar $e$, placing one cog in front of the other, just half its thickness, so that the cogs on one side of the rack fill the entire spaces on the opposite side, thereby obviating the great difficulty of the slipping and breaking of cogs, with great pressure, by overcoming the space that would occur between cogs, the same size and length, on a straight line; also reducing the friction.

The use of the eccentric $a$, on the shaft $g$, just above the pinion $d$ that works in rack $t$, is to assist the cogs, at the time of the greatest pressure, in pressing a bale of cotton by operating against the shoulders $bb$ on the rack-bar $e$, near each end. The lever $h$, the eccentric $a$, and pinion $d$ are attached to shaft $g$, which operates the rack $t$ to the right and left, so as to press a bale of cotton at each end of cotton-boxes $ss$ alternately. The rack $t$, the shoulders $bb$, that the eccentric $a$ operates against, and the plungers $ff$, are attached to the rack-bar $e$. The press is operated by horse-power attached to one or both ends of the lever $h$, which is sufficiently long to admit the horses to pass around the press. Three and a half revolutions of the lever press a bale of cotton.

What I consider new, and claim for my invention, and desire to secure by Letters Patent, is—

The combination of the peculiar construction of cogs and eccentric-wheel, so as to prevent cogs from breaking with great pressure, as described in the specification.

EDWARD STUART.

Witnesses:
J. W. WILKERSON,
G. R. BRIDGES.